United States Patent
Ogi et al.

(10) Patent No.: US 6,809,868 B2
(45) Date of Patent: Oct. 26, 2004

(54) ROD LENS ARRAY AND A PROCESS FOR PRODUCING THE SAME

(75) Inventors: Shuya Ogi, Osaka (JP); Takashi Fukuzawa, Osaka (JP); Koichiro Iki, Osaka (JP); Masahide Wakisaka, Osaka (JP); Kiyotaka Sasaki, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 10/408,347

(22) Filed: Apr. 8, 2003

(65) Prior Publication Data

US 2003/0193721 A1 Oct. 16, 2003

Related U.S. Application Data

(62) Division of application No. 09/964,735, filed on Sep. 28, 2001.

(30) Foreign Application Priority Data

Sep. 29, 2000 (JP) .................................... P2000-298424
Nov. 10, 2000 (JP) .................................... P2000-343212
Feb. 16, 2001 (JP) ...................................... P2001-40110

(51) Int. Cl.$^7$ .............................................. G02B 27/10

(52) U.S. Cl. ....................... 359/622; 359/652; 359/619
(58) Field of Search ................................ 359/619–623, 359/652–654

(56) References Cited

U.S. PATENT DOCUMENTS 4,623,937 A * 11/1986 Watanabe .................... 358/483
5,500,523 A *  3/1996 Hamanaka ................... 250/216
6,031,668 A *  2/2000 Toyama et al. .............. 359/654
6,366,408 B1 *  4/2002 Kittaka et al. .............. 359/620

FOREIGN PATENT DOCUMENTS

JP     58-38910         3/1983
JP     06252450 A   *   9/1994    ........... H01L/33/00
JP      7-46383         2/1995
JP      9-90105         4/1997

* cited by examiner

Primary Examiner—Jordan M. Schwartz
Assistant Examiner—Jessica Stultz
(74) Attorney, Agent, or Firm—Whitham, Curtis & Christofferson, P.C.

(57) ABSTRACT

An aligning tool having a plurality of grooves formed side by side is provided; gradient index rod lenses are placed in alignment within the grooves at an average spacing of 1 μm–5 μm; the gradient index rod lenses are fixed to form an integral unit as they maintain the aligned state; thereafter the end faces of each rod lens are polished.

25 Claims, 14 Drawing Sheets

TRACING DIRECTION

TRACING DIRECTION

PITCH OF V GROOVES

RELATIONSHIP BETWEEN THE SPACING OF LENS
PREFORMERS AND THE VARIATION IN ALIGNMENT PITCH

LIGHT-EMITTING
PORTION

IMAGING
SURFACE

POTENTIAL FOR LATENT
IMAGE FORMATION ON
PHOTORECEPTOR DRUM

POSITION ON PERIPHERAL LENS
SURFACE IN LONGITUDINAL DIRECTION

POSITION ON PERIPHERAL LENS SURFACE IN LONGITUDINAL DIRECTION

ROD LENS ARRAY AND A PROCESS FOR PRODUCING THE SAME

This application is a division of U.S. patent application Ser. No. 09/964,735 filed Sep. 28, 2001.

BACKGROUND OF THE INVENTION

This invention relates to a process for producing a rod lens array in which a multiple of gradient index rod lenses are precision arranged parallel to each other at given spacings and fixed between two side plates (frames) as they are buried in a resin. The rod lens array is typically useful as an optical component for an image writing system in an electrophotographic printer.

The rod lens array is an optical component that has a multiple of tiny gradient index rod lenses arranged in alignment so that they combine together to form a single continuous erected unit-magnification image. The rod lens array has a short optical pathlength and needs no inverting mirror; because of the size-reducing feature, the rod lens array is commonly used as an optical component not only for an image reading system in an image scanner, a copier, etc. but also for an image writing system that forms a latent image on a photoreceptor in accordance with supplied image signals. Recent models of electrophotographic printer have been improved to achieve high image resolution comparable to that offered by silver halide photography. This has accordingly increased the requirement for higher precision in latent image and, hence, for better quality of image writing optical components in terms of the precision of the position in which image is formed.

A common process for the production of the rod lens array includes an assembly step in which a multiple of lens preformers are arranged in contact with each other and fixed between an upper and a lower side plate (frame plate) to form a block, an impregnation and curing step in which a resin is impregnated between the individual lens preformers in the block, and a cutting step in which the block is cut to a specified lens length. The side plates are usually fiber glass-reinforced plastic laminated plates (FRP plates).

In the assembly step, two methods are commonly used. In one method, a plurality of gradient index rod lenses are aligned on a flat frame such that their outer peripheral surfaces contact each other and they are altogether fixed to maintain the aligned state (this method is hereunder referred to as the "diameter referenced method"). The other method uses an aligning tool having a plurality of V-shaped grooves cut side by side in the surface of a platen on specified pitches, and gradient index rod lenses placed in the respective V-shaped grooves are fixed altogether to maintain their aligned state (this method is hereunder referred to as the "mechanically referenced method"; see JP 9-90105 A).

The surface of an FRP plate has fine periodical asperities due to the texture of the woven glass fabric used in its production and hence the individual lens preformers are likely to be offset positionally during the assembly and impregnation steps. Positional offset also occurs due to the warpage of lens preformers and their surface roughness. In addition, both the diameter referenced method and the mechanically referenced method have their own problems.

Consider, for example, an image writing system of the type shown in FIG. 11; a light emitting portion (LED device) 10 blinks in accordance with image signals and a rod lens 12 forms a latent image on an imaging surface (photo receptor drum) 14. Any deviation from the desired alignment of rod lenses 12 results in a great variation in the potential at which the latent image is formed on the photoreceptor drum. On account of this variation in the imaging position that results from misalignment of the rod lenses, the image resolution that can be achieved by the image writing optical system is limited.

To make an acceptable rod lens array, gradient index rod lenses must be aligned such that adjacent lenses have a constant axial spacing (or "alignment pitch") and that there be neither inclination in the plane of alignment (which is hereunder referred to as "horizontal inclination") nor inclination in a direction normal to the plane of alignment (which is hereunder referred to as "height inclination"). The height inclination can be suppressed in the diameter referenced method. On the other hand, due to contact between gradient index rod lenses, a horizontally inclined lens affects an adjacent lens and the lenses taken as a whole may occasionally be inclined horizontally to suffer "axial displacement". In the case of a printer or facsimile, this causes an image to be formed in a position far distant from where it should he.

The mechanically referenced method can provide higher precision in lens alignment. On the other hand, individual gradient index rod lenses sometimes fail to be placed uniformly within V-shaped grooves in the platen, causing one lens to be inclined with respect to another. Since it is unavoidable that lens preformers vary in diameter, the setting of the pitch between grooves in the platen must not be smaller than a maximum value for the variation in the diameter of lens preformers. As a result, very small gaps occur between arranged lens preformers and positional offset may occur during the mounting of side plates. In the "partial" burial step where one side plate is mounted, the grooved platen adequately protects against positional offset but in the "complete" burial step where the grooved platen is removed and the other side plate is mounted, the precision in the alignment of lens preformers may drop since there is nothing that controls the positional offset. In a printer or facsimile, this is a cause of failures such as an overlap of pixels.

Next, we describe the positional offset of rod lenses and their departure from the desired alignment on account of their surface roughness. The rod lenses to be used in the rod lens array are mainly produced by ion-exchange. As shown graphically in FIG. 17, a beam of incident light which falls on an end face of a rod lens 12 at an angle smaller than its angular aperture $\theta_0$ is an effective ray 21 on the other hand, a beam of light incident at an angle greater than $\theta_0$ undergoes regular reflection at the internal specular surface of the rod lens 12 which is manufactured by drawing. The reflected beam is so-called "stray" light 22 which takes no part in image formation and therefore lowers the contrast of the rod lens 12. Furthermore, the rod lens array is constructed by a multiple of rod lenses 12 and the stray light 22 occurring in individual rod lenses 12 will reduce the overall contrast of the rod lens array.

In known rod lens arrays, a multiple of rod lenses arranged in one or two rows are fixed between two frame plates and a black silicone resin is filled between lenses and between each frame plate and lenses.

FIG. 18 shows a conventional method of removing stray light 22 by allowing it to scatter. To this end, the peripheral surface of the rod lens 12 is removed to some extent by a surface treatment and tiny asperities 23 are formed around it (see, for example, JP 58-38901 A). The stray light 22 incident on the surface of the area where asperities 23 are formed is scattered as indicated by 25. In addition, the black silicone resin 24 covering the peripheral surface of the rod lens 12 absorbs the scattered light 25, eventually suppressing the stray light 22.

In fact, however, the peripheral surface of the conventional rod lens has a profile as shown in FIG. 19 and suffers the following disadvantages. FIG. 19 shows the roughness, or the degree of unevenness, of the peripheral surface of a rectilinear area in the longitudinal direction of the conventional rod lens.

The first problem arises from the fact that the amount of removal from the peripheral lens surface varies from one lens to another and so does the lens diameter. If the rod lenses are arranged with reference to the frame plates, there occurs a departure from the desired lens arrangement due to the variation in lens diameter and the optical axis of one rod lens is inclined with respect to the optical axis of another.

Secondly, due to the lens-to-lens difference in the roughness of the peripheral lens surface, there occurs a variation in the effective aperture of the lens that contributes to satisfactory imaging. This causes a variation in the resolving power of the rod lens array in a longitudinal direction. With decreasing surface asperities, the lens surface has an increased degree of specularity and becomes more susceptible to the effect of stray light; it is therefore considered necessary that the peripheral surface of each rod lens have a center-line-average roughness of at least 0.5 $\mu$m.

SUMMARY OF THE INVENTION

The present invention has been accomplished under these circumstances and has as an object providing a high-performance rod lens array that can be produced by the mechanically referenced method and which still features good axial alignment without suffering the inconsistency in the pitch on which gradient index rod lenses are arranged and two types of inclination, height and horizontal.

Another object of the invention is to provide a process for producing a rod lens array which not only prevents lens preformers from being positionally offset while they are arranged but which can also constrain their movement during installation of side plates, thereby suppressing the variation in the arrangement of lens preformers (their positional offset).

Another object of the invention is to provide a process for producing a rod lens array which can suitably be used as a component in an image writing optical system to insure higher precision in the imaging position.

Yet another object of the invention is to provide a process for producing a rod lens array using side plates furnished with a means for constraining the movement of lens preformers which can be easily formed in high dimensional precision and at low cost, allowing for the use of lens preformers or smaller diameter.

Further another object of the invention is to provide rod lenses that can be arranged with a small enough departure from the desired alignment to produce a rod lens array that will experience minimum variations in resolving power in a longitudinal direction.

The present inventors studied how the spacing between adjacent gradient index rod lenses to be used in producing a rod lens array by the mechanically referenced method would affect their alignment pitch of, as well as their height and horizontal inclinations. As a result, they found that by setting the spacing to lie within a specified range, the variation in the alignment pitch of rod lenses, the variation in their height inclination (standard deviation, hereunder referred to as "height variation") and the variation in their horizontal inclination (standard deviation, hereunder referred to as "horizontal variation") could be reduced to their minimum levels. The present invention has been accomplished on the basis of this finding.

In order to attain the stated objects, the present invention provides the following two processes for production (1) A process for producing a rod lens array comprising the steps of providing an aligning tool having a plurality of grooves formed side by side, placing gradient index rod lenses in alignment within the grooves at an average spacing of 1 $\mu$m–5 $\mu$m, fixing the gradient index rod lenses to form an integral unit as they maintain the aligned state, and thereafter polishing the end faces of each rod lens.

(2) A process for producing a rod lens array comprising the steps of providing an aligning tool having a plurality of grooves formed side by side, placing gradient index rod lenses in alignment within the grooves at an average spacing of 1 $\mu$m–5 $\mu$m, then fixing the gradient index rod lenses as they maintain the aligned state, thereafter removing the aligning tool, then cutting each rod lens to a specified lens length, and thereafter polishing the end faces of each rod lens.

To attain similar objects, the present invention provides a rod lens array that is produced by the process described above in (1) or (2) and which has the gradient index rod lenses aligned at an average spacing of 1 $\mu$m–5 $\mu$m.

The present invention provides a process for producing a single-row rod lens array comprising:

a lens preformer arranging step in which a grooved platen having a multiple of shallow grooves to receive gradient index rod lens preformers formed parallel to each other at equal spacings is supplied with a multiple of lens preformers such that they are placed in alignment within said shallow grooves;

a partial burial step in which an impregnating resin sheet and a side plate are placed in a face-to-face relationship with the group of arranged lens preformers, then heat is applied to render said resin sheet viscous and pressure is also applied so that the individual lens preformers are bonded to the side plate as they are partially buried in the resin and, thereafter, the bonded lens preformers ate detached from said platen; and a complete burial step in which an impregnating resin sheet and a side plate are placed in a face-to-face relationship with the partially buried lens preformers in array form, then heat is applied to render said resin sheet viscous and pressure is also applied so that the individual lens preformers are bonded to the side plate as they are buried completely in the resin;

characterized in that a side plate with a striped pattern of multiple ridges that extend along the lens preformers are arranged on the same pitch as the lens preformers on the surface of a side plate substrate which is to bear the lens preformers is used as the side plate in the partial burial step or in both partial and complete burial steps and the lens preformers are bonded to said side plate such that each of them is located between adjacent ridges.

The present invention also provides a process for producing a two-row rod lens array comprising:.

a lens preformer arranging step in which a grooved platen having a multiple of shallow grooves to receive gradient index rod lens preformers formed parallel to each other at equal spacings is supplied with a multiple of lens preformers such that they are placed in alignment within said shallow grooves;

a partial burial step in which an impregnating resin sheet and a side plate are placed in a face-to-face relationship with the group of arranged lens preformers, then heat is applied to render said resin sheet viscous and pressure is also applied so that the individual lens preformers are bonded to the side plate as they are partially buried in the resin and, thereafter, the bonded lens preformers are detached from said platen, and a complete burial step in which an impregnating resin sheet is placed between two arrays of the partially buried lens preformers such that the lens preformers in one array are in a face-to-face relationship with those in the other array, then heat is applied to render said resin sheet viscous and pressure is also applied so that the individual lens preformers are bonded to the side plate as they are buried completely in the resin;

characterized in that a side plate with a striped pattern of multiple ridges that extend along the lens preformers are arranged on the same pitch as the lens preformers on the surface of a side plate substrate which is to bear the lens preformers is used as the side plate in the partial burial step and the lens preformers are bonded to said side plate such that each of them is located between adjacent ridges.

In order to reduce the positional offset that may occur in imaging by the rod lens array, the variation in the arrangement of lens preformers has to be reduced. The variation in lens arrangement occurs not only when the lens preformers are arranged; it also occurs if lens preformers move during installation of side plates. In the present invention, the movement of lens preformers is constrained by the ridges which are formed on the side plates per se. Since these ridges are provided on the side plate substrate which is part of the final product per se, they have to be formed at low enough cost and, in addition, must satisfy high dimensional precision requirements so that lens preformers of smaller diameter ($D \leq 1$ mm) can be used. As a prior art technique, JP 7-46383 A has proposed that groove shapes be formed in the side plates of a lens array. To form groove shapes, grooves may be transferred to the side plates by pressing or they may be cut by mechanical working. However, realizing the depth and pitch of grooves that have sufficient precision to permit the use of finer rod lenses requires sophisticated facilities and high cost and, hence, is not practically feasible. In the present invention, a multiple of ridges rather than grooves are formed in high precision. Ridges are preferably formed by screen printing or photolithography. By either method, ridges of a rectangular cross section can be formed in precise alignment.

In the case of screen printing, a coating is desirably applied to the entire surface of one side of a side plate substrate to form an undercoat and a multiple of ridges to assist in arrangement of lens preformers are formed on the undercoat. The undercoat may be formed by applying one or two layers of a coat having a thickness of 5–15 $\mu$m; the ridges may have a thickness of 10–30 $\mu$m that is relatively easy to control in precision; the pitch of the ridges may be set at a value near the maximum variation in the diameter of lens preformers that is anticipated in the manufacturing process.

The side plate substrate may be a fiber glass-reinforced plastic laminated plate (FRP plate) or a glassplate. The undercoat is effective in reducing the tiny surface asperities that have been caused by the texture of the woven glass fabric. In the case of a glass plate, it is rendered light-opaque by mixing with a black pigment or the like so as to impart the ability to prevent leaky light (stray light). To insure adequate bonding strength at the interface with the resin to be impregnated between lens preformers, an epoxy resin based coating is desirably used to form the undercoat and ridges.

In the case of photolithography, a resist is applied to the entire surface of the side plate substrate which is then exposed to light through a mask and the areas that have become soluble are etched away to form a multiple of ridges in a desired pattern. Preferably, the conditions for resist application and etching are controlled such that ridges 10–30 $\mu$m thick are formed on the underlying resist blanket having a thickness of 5–15 $\mu$m.

The present invention provides a rod lens having a center-line-average roughness of 0.5 $\mu$m–2.0 $\mu$m on the peripheral surface.

It has been verified that if the peripheral surface of the rod lens has a center-line-average roughness of 0.5 $\mu$m–2.0 $\mu$m the effect of stray light can be eliminated to suppress the variation in resolving power.

The present invention also provides a rod lens array in which the constituent rod lenses are such that representative values for the center-line-average roughness on their peripheral surfaces are between 0.01 $\mu$m and 0.2 $\mu$m as averaged for the whole lens array.

This design has also been verified to be effective in eliminating the effect of stray light to suppress the variation in resolving power.

The present invention also provides a rod lens array in which the constituent rod lenses are such that representative values for the center-line-average roughness on their peripheral surfaces are between 0.01 $\mu$m and 0.2 $\mu$m as expressed by standard deviation for the whole lens array.

With this design, variation is less likely to occur in the effective lens aperture which contributes to image formation.

The present invention also provides a rod lens array in which the constituent rod lenses are such that representative values for their diameters are between 0.01 $\mu$m and 2.5 $\mu$m as expressed by standard deviation for the whole lens array.

With this design, departures from the desired lens arrangement are less likely to occur from the variation in rod lens diameter.

The representative values for the center-line-average roughness may each be a value on a straight line that extends on the peripheral surface of the lens parallel to its axis. Alternatively, they may each be the average of values on different straight lines that extend on the peripheral surface of the lens along its axis.

Each of the rod lens arrays described above has preferably a resin portion that is integral with the constituent rod lenses such that it fills the gap between adjacent rod lenses and surrounds all rod lenses.

In this design, the rod lenses are surrounded by the resin and stray light can be absorbed most effectively if the resin is a good light absorber such as a black resin.

Preferably, a frame plate is fixed to at least one of the two outer surfaces of said resin portion which are lateral to the thickness of the array.

With this design, a plurality of rod lenses can be easily arrayed with the frame plate used as a guide. As a result, a highly precise rod lens array can be realized.

The present disclosure relates to the subject matter contained in Japanese patent application Nos. 2000-298424 (filed on Sep. 29, 2000), 2000-343212 (filed on Nov. 10, 2000) and 2001-40110 (filed on Feb. 26, 2001), which are expressly incorporated herein by reference in their entireties.

DESCRIPTION OF THE PREFERRED EMBODIMENT

Figure 1A:
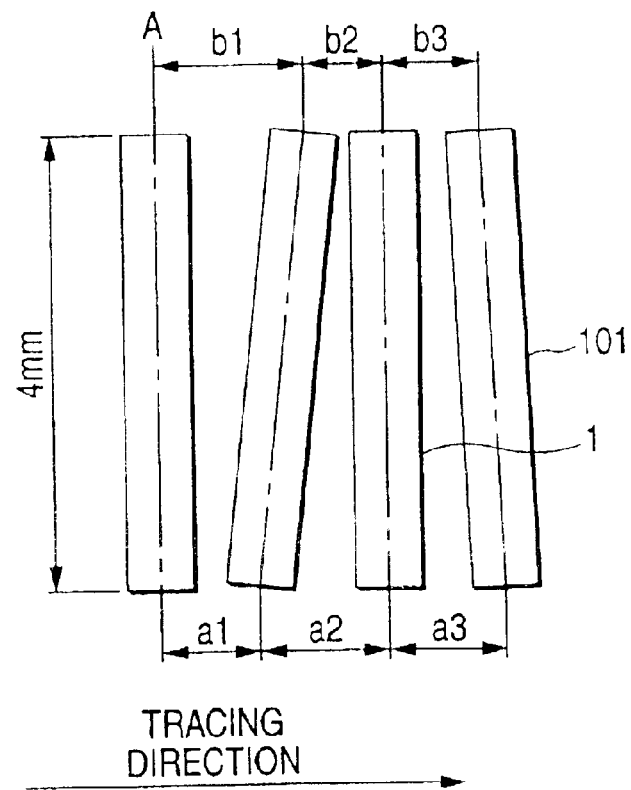
FIG. 1A is a plan view illustrating how a plurality of gradient index rod lenses are arrayed.
Figure 1B:
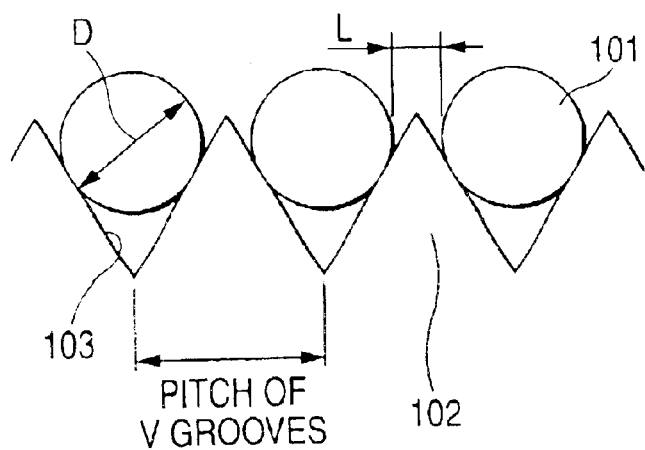
FIG. 1B is a sectional view of the arrayed rod lenses.

The present invention is described below in detail with reference to accompanying drawings FIG. 1A is a top view showing how a plurality of gradient index rod lenses 101 are placed within V-grooves 103 in an aligning platen 102. FIG. 1B is a side view of the gradient index rod lenses as seen from an end. Suppose the gradient index rod lenses 101 shown in FIG. 1A are spaced on pitches a1, a2, a3, . . . at one end and on pitches b1, b2, b3, . . . at the other end, as measured between longitudinal axes A. Then, the horizontal inclinations of the respective rod lenses 101 are expressed by (b1-a1), (b2-a2), (b3-a3), . . . If adjacent rod lenses 101 are parallel to each other, the lens-to-lens distance L is expressed by the difference between the lens diameter D and the pitch of V-grooves. Therefore, the lens-to-lens distance L can be adjusted to a desired value by controlling the lens diameter D and the pitch of V-grooves.

To confirm this finding, the present-inventors prepared an aligning platen 102 having about 400 V-grooves cut at spacings of 570 $\mu$m. As gradient index rod lenses 101, the inventors used four types that were 100 mm long and which were 570 $\mu$m, 568 $\mu$m. 566 $\mu$m and 564 $\mu$m in diameter D. The rod lenses of each type were placed within the V-grooves in the platen 102 and transferred onto a frame having an adhesive coat. The resulting variation in alignment pitch, as well as horizontal and height variations were measured for each type of rod lenses. The frame (side plate) was formed of either glass or FRP (fiber glass-reinforced plastic) The four types of rod lenses had the following relationships between D and L (both in micrometers).

| Diameter D | Lens-to-lens Distance L |
|---|---|
| 570 | 0 |
| 568 | 2 |
| 566 | 4 |
| 564 | 6 |

Figure 2:
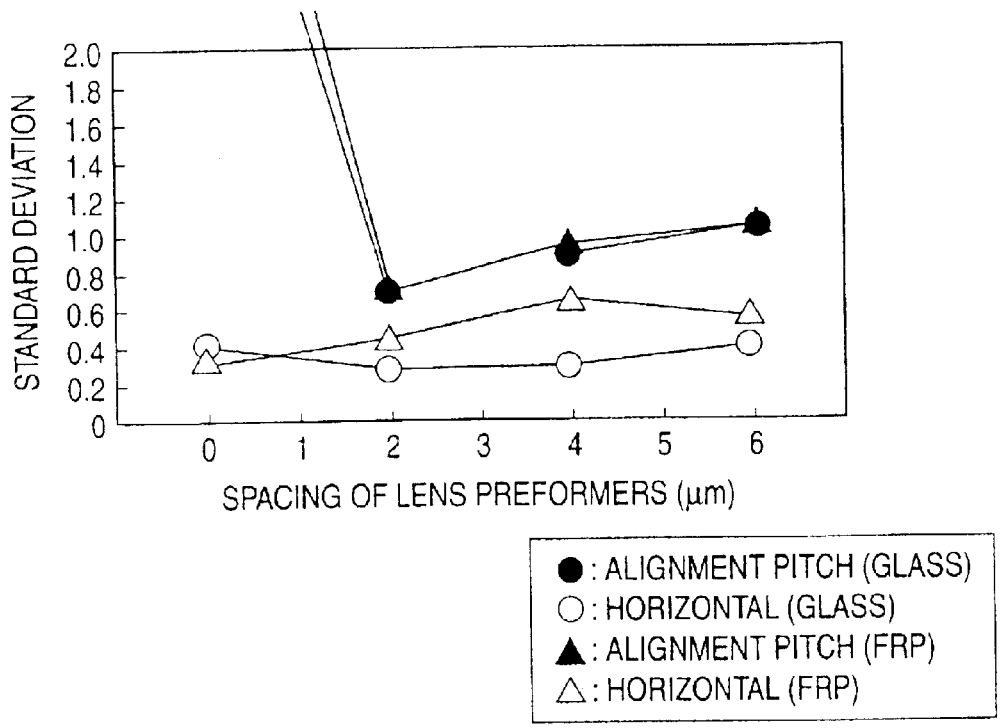
FIG. 2 is a graph showing experimental data for the relationship the spacing of gradient index rod lenses has with the variation in their alignment pitch and the horizontal variation.
Figure 3:
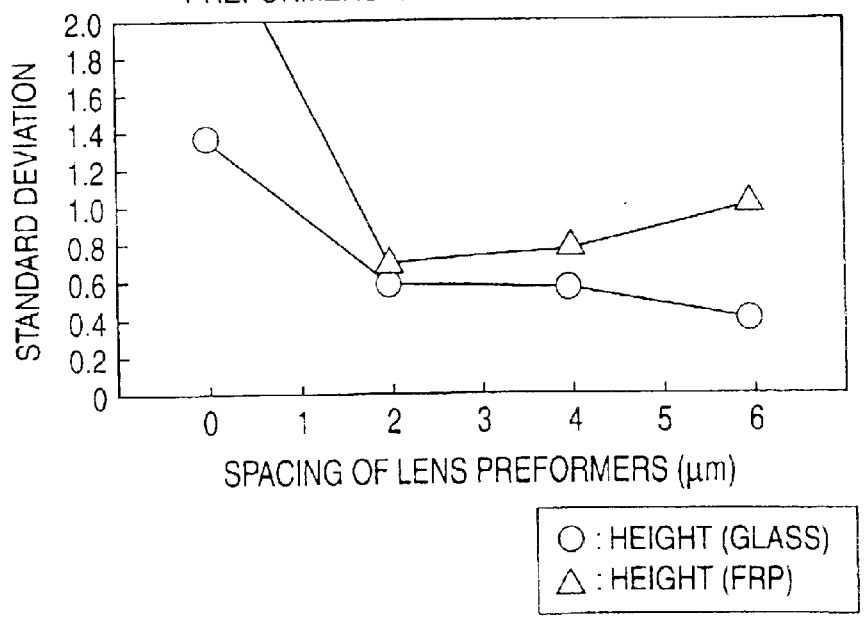
FIG. 3 is a graph showing experimental data for the relationship between the spacing of gradient index rod lenses and their height variation.

The measurements were conducted by the stylus tracer method As FIG. 1A shows, the probe was traversed across the peripheral surface of each rod lens 101 over a sampling length of 4 mm parallel to lens length. A circle having a diameter equivalent to D was fitted to each of the measured surface profiles and the position of its center was determined to calculate the pitch between lenses and the height of each lens. On the basis of the measurements in two positions, the horizontal and height inclinations were calculated to determine the variation (standard deviation) for the entire part of a particular lens array. Table 1 shows three kinds of variation, the variation in alignment pitch, the horizontal variation and the height variation, for each tested value of the lens-to-lens distance L of rod lenses 101. The variation in alignment pitch and the horizontal variation are plotted in FIG. 2, and the height variation in FIG. 3.

TABLE 1

| | | Lens-to-lens distance L ($\mu$m) | | | |
|---|---|---|---|---|---|
| | | 6 | 4 | 2 | 0 |
| Glass Frame | Alignment pitch | 1.09 | 0.93 | 0.72 | 3.99 |
| | Horizontal variation | 0.43 | 0.31 | 0.29 | 0.43 |
| | Height variation | 0.45 | 0.54 | 0.60 | 1.39 |
| FRP Frame | Alignment pitch | 1.08 | 0.99 | 0.73 | 3.66 |
| | Horizontal variation | 0.59 | 0.67 | 0.46 | 0.35 |
| | Height variation | 1.05 | 0.83 | 0.74 | 2.64 |

As Table 1 shows, the variation in alignment pitch could be suppressed by adjusting the lens-to-lens distance L to lie within the range of 2 $\mu$m–5 $\mu$m; the horizontal variation could be suppressed by adjusting L to lie within the range of 1 $\mu$m–5$\mu$m; the height variation could be suppressed by adjusting L to lie within the range of 2 $\mu$m–5 $\mu$m. One may therefore conclude that for balanced suppression of the variation in alignment pitch, horizontal variation and height variation, it is generally effective to specify the lens-to-lens distance L of gradient index rod lenses 101 to lie within the range of 1 μm–5 μm, preferably within the range of 2 μm–5 μm. This conclusion holds irrespective of whether the frame is formed of glass or FRP.

A similar experiment was performed on other values for the diameter (D) of gradient index rod lenses 101. The platen 102 was accordingly changed to one having V-grooves formed on a pitch of 305 μm. Evaluation was made for the case of using a glass frame. The rod lenses had the following relationships between D and L (both in micrometers).

| Diameter D | Lens-to-lens Distance L |
|---|---|
| 305 | 0 |
| 303 | 2 |
| 301 | 4 |
| 298 | 7 |
| 296 | 9 |

Figure 4:
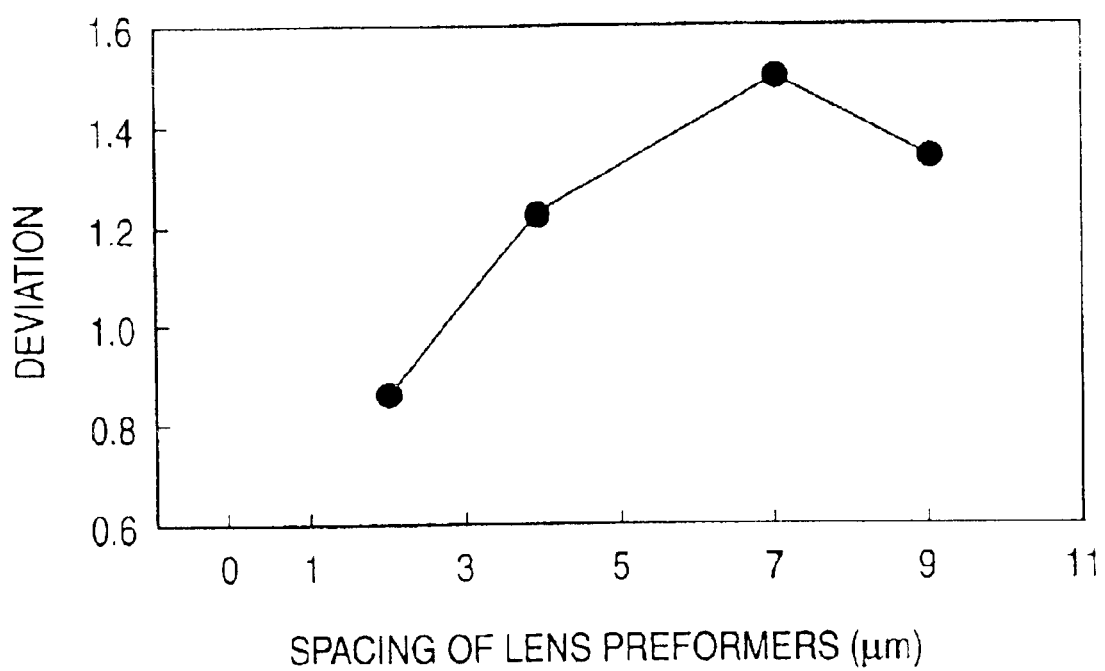
FIG. 4 is a graph showing experimental data for the relationship between the spacing of gradient index rod lenses and the variation in their alignment pitch.

Similarly, the variation in lens pitch was determined by the stylus tracer method. The result is shown in Table 2 and FIG. 4. The data also shows that the variation in alignment pitch could be suppressed by adjusting the lens-to-lens distance L of rod lenses 101 to lie within the range of 2 μm–5 μm.

TABLE 2

| | Lens-to-lens distance (μm) | | | |
|---|---|---|---|---|
| | 2 | 4 | 7 | 9 |
| Deviation | 0.85 | 1.22 | 1.48 | 1.33 |

The foregoing experiments have shown that in order to produce a rod lens array by aligning a plurality of gradient index rod lenses 101 on the V-grooved platen 102, the lens diameter D and the pitch of V-grooves are desirably set at such values that the lens-to-lens distance L of adjacent rod lenses 101 is in the range of 1 μm–5 μm preferably in the range of 2 μm–5 μm. In most cases of the actual manufacturing process, the lens diameter D is preliminarily set in accordance with the specifications of the rod lens array to be produced, so it is common practice to use a platen having V-grooves that have been so designed that the difference between D and the pitch of V-grooves is between 1 μm and 5 μm, preferably between 2 μm and 5 μm. Note that the grooves to be formed in the platen need not be V-shaped but may be U-shaped or semicircular.

Hence, the process of the present invention for producing a rod lens array is also implemented by using a V-grooved platen 102 on which the pitch of V grooves has been set in accordance with the diameter D of the gradient index rod lenses 101. Described below is a preferred embodiment of the present invention as it relates to a process for producing a rod lens array.

To begin with, gradient index rod lenses 101 having a specified lens length are placed within the V-grooves in the platen 102 which has been designed to have a specified pitch of V grooves that conform to the lens diameter D. Then, an adhesive is filled in the gap between rod lenses 101 and subsequently cured so that adjacent rod lenses will be bound together. Instead of filling the adhesive, an adhesive sheet may be placed over all rod lenses 101 and subsequently pressed down until the rod lenses 101 are buried to a specified depth in the adhesive sheet. Thereafter, both end faces of each rod lens 101 are polished and the grooved platen 102 is removed to leave a rod lens array behind which is an integral assembly of gradient index rod lenses 101 that are aligned at spacings of 1 μm–5 μm.

As will be clear from the foregoing description, the present invention provides a high-performance rod lens array that can be produced by the mechanically referenced method and which still features good axial alignment without suffering the inconsistency in the pitch on which gradient index rod lenses are arranged and two types of inclination, height and horizontal.

Figure 5A:
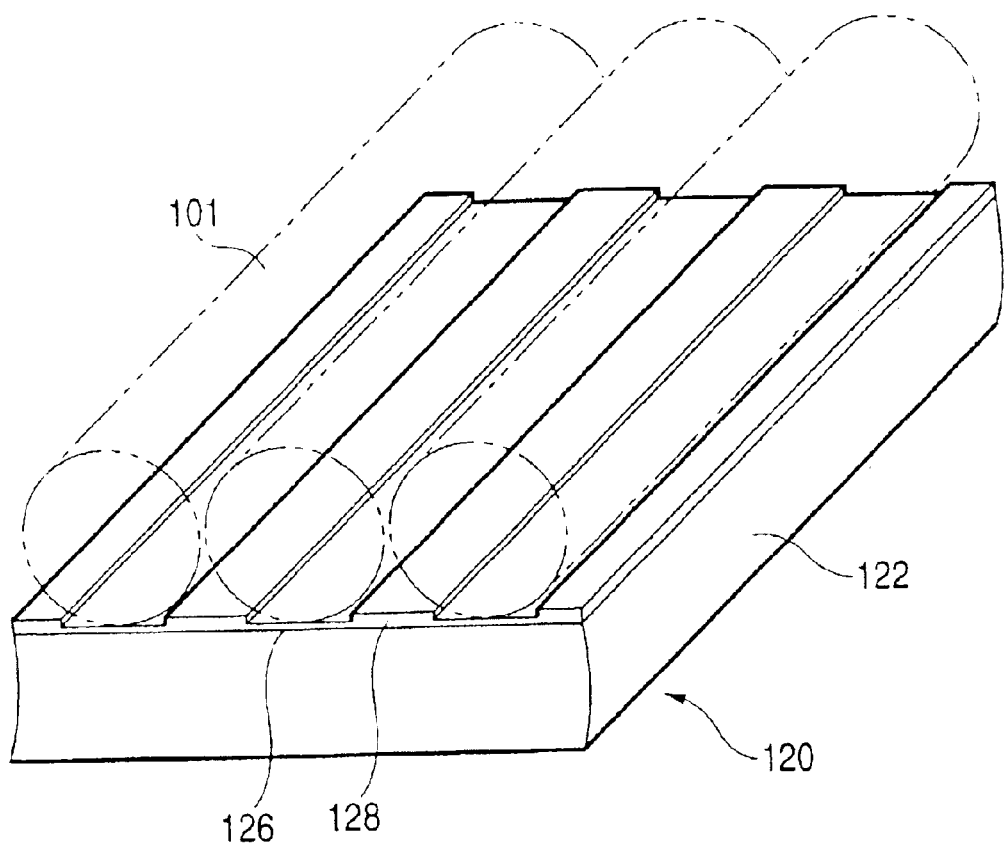
FIG. 5A is a perspective view of an exemplary side plate to bemused in the process of the invention.
Figure 5B:
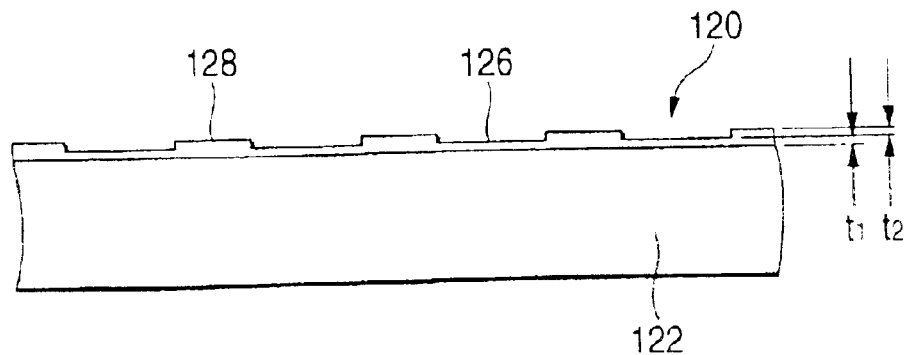
FIG. 5B is a section of FIG. 5A.

FIGS. 5A and 5B show an exemplary side plate that can be used in the invention. To prepare a side plate 120, the entire surface of the side of a side plate substrate 122 where lens preformers 101 are to be placed is screen printed with a coating to form an undercoat 126 which, in turn, is screen printed with the same coating to form a striped pattern of ridges 128 that extend along the lens preformers on the same pitch as the lens pitch.

The side plate substrate 122 is an FRP plate and the coating is epoxy resin based. The undercoat 126 is formed by applying two layers of a coat to give a thickness ($t_1$) of 25 μm; the ridges have a thickness ($t_2$) of 25 μm that is relatively easy to control in precision. The pitch of the ridges is set at a value near the maximum variation in the diameter of lens preformers that is anticipated in the manufacturing process.

An FRP plate has tiny asperities on the surface that have been caused by the texture of the woven glass fabric. The undercoat is effective in reducing such tiny surface asperities. Using an epoxy resin based coating to form the undercoat and ridges is preferred since adequate bonding strength is insured at the interface with the resin to be impregnated between lens preformers.

Figure 6A:
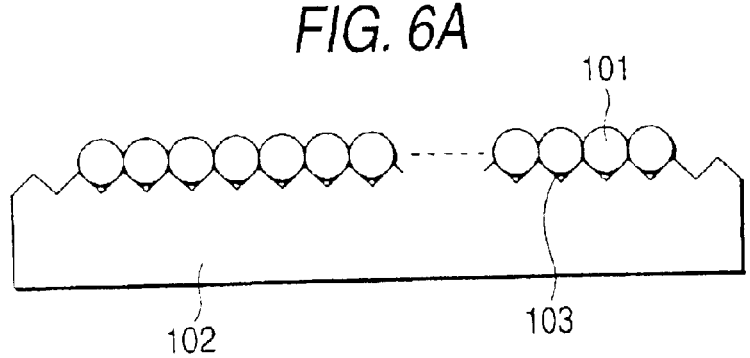
FIGS. 6A–6C show steps in a process for preparing an array of partially buried lens preformers.
Figure 6B:
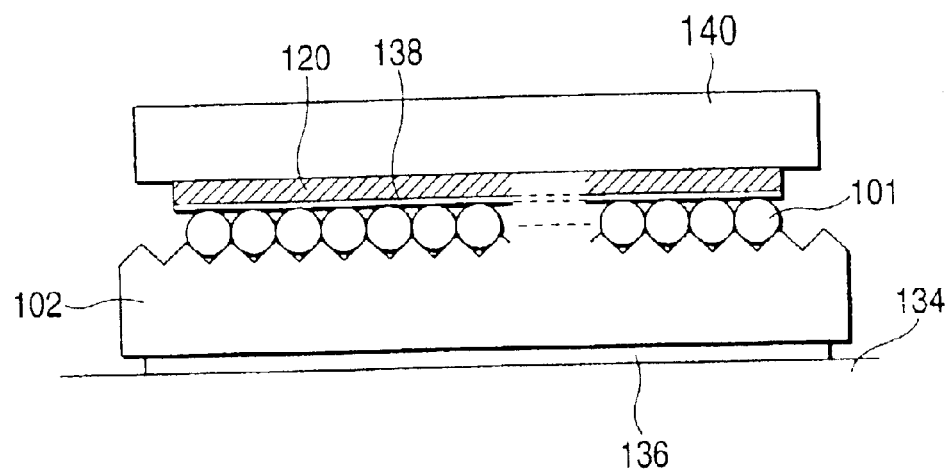
Figure 6C:
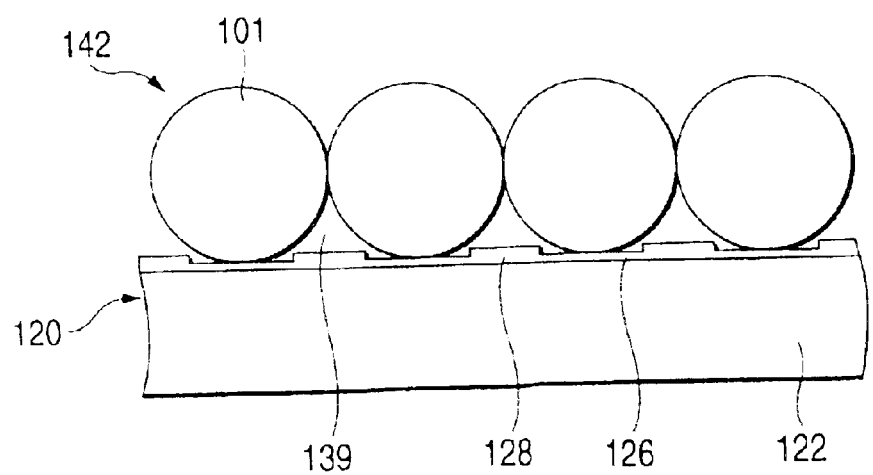

FIGS. 6A–6C show steps in an example of the process of the present invention for producing a rod lens array in the invention, a grooved platen is used to array gradient index rod lens preformers. As shown in FIG. 6A, the grooved platen 102 is a member that has a multiple of shallow grooves 103 formed parallel to each other in the top surface of a flat metal plate at equal spacings so that lens preformers 101 rest partially within the grooves; the platen 102 is a rectangle that is several hundred millimeters on each side. Each of the shallow grooves 103 has a V-shaped cross section and is sufficiently shallow that at least the upper half of a lens preformer 101 will stick out when it is put in the groove. The difference between lens diameter D and the pitch of shallow grooves 103 is preferably set to be lie within the stated range of 1 μm–5 μm. The lens preformers 101 are thin glass rods having a diameter of about 0.6 mm and a length of about 400 mm. The grooved platen 102 is supplied with a multiple of lens preformers 101 so that they are placed within the individual shallow grooves 103 and subjected to the following step of precision arrangement such that they make substantial contact with each other.

As shown in FIG. 6B, the grooved platen 102 rests on a work bench 134 with a heat insulating sheet 136 placed between the two parts. In a separate step, a thin impregnating resin sheet 138 is provisionally bonded to the side of the side plate 120 where the ridges have been formed. As in the prior art, the resin sheet 138 may be a black resin sheet and to make this resin sheet, a resin having islands of a thermoplastic resin dispersed in the matrix of a thermosetting resin is mixed with a black pigment (carbon black) and processed to a sheet in a thickness of about 80 μm. On top of the arrayed lens preformers 101, the side plate 120 is placed to which the resin sheet 138 has been provisionally bonded. The resin sheet 138 is then heated to become viscous and given pressure under a weight 140 placed on top of the side plate 120. As a result, the resin in the resin sheet 138 flows into the gaps between the lens preformers 101 which are partially buried in the fluid resin. Any warpage of the lens preformers is straightened out since they are pressed onto the bottoms of the shallow grooves 103 while at the same time they are pressed onto the areas between ridges on the side plate. Hence, if the resin is provisionally cured as such, the lens preformers 101 are fixed provisionally in a precision arranged state. Thereafter, the lens preformers 101 are detached from the grooved platen 102 to give a lens preformer array 142 which has the individual lens preformers buried partially in the resin as shown in FIG. 5C. Reference numeral 139 represents the fluidized impregnating resin. Since the movement of each lens preformer 101 is constrained between adjacent ridges 128 on the side plate 120, the precision arrangement of the lens preformers 101 is maintained even if they are detached from the grooved platen 102.

Figure 7:
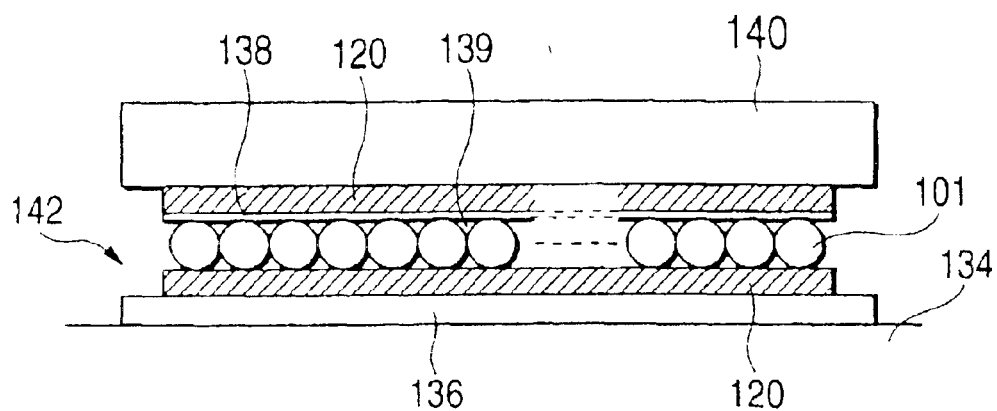
FIG. 7 shows a step in a process for preparing a single-row array of lens preformers.

To produce a single-row rod lens array, the step shown in FIG. 7 is added. On the side of the partially buried lens preformer array 142 where the lens preformers were placed in the previous step, another side plate 120 having the same striped pattern of ridges as described above and a thin impregnating resin sheet 138 provisionally bonded by thermocompression to the side of the side plate 120 where the ridges have been formed are placed, with care being taken to position the second side plate such that each lens preformer is located between ridges. The resin sheet 138 is then heated to become viscous and given pressure under a weight 140. As a result, the impregnating resin in the resin sheet 138 flows to get into the gaps between lens preformers so that they are completely buried in the resin. The resin is then cured completely to fix the lens preformers. In this step, the movement of each lens preformer is constrained between ridges on the side plate, so there will be no departure from the desired precision arrangement of lens preformers.

Figure 8:
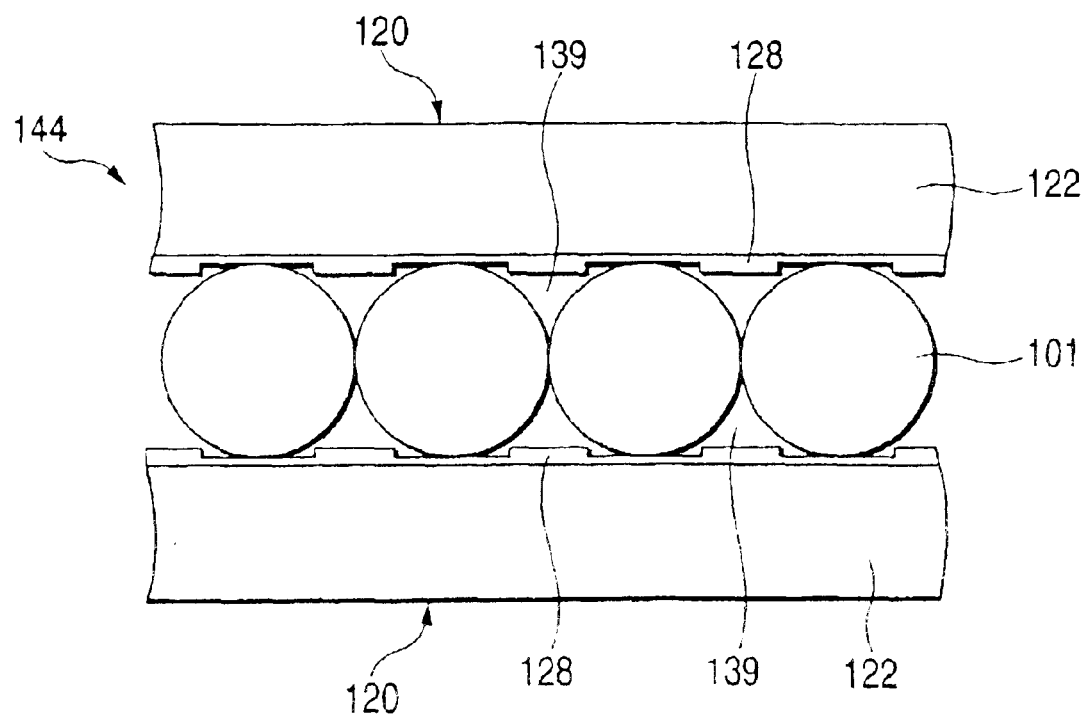
FIG. 8 shows an exemplary single-row array of lens preformers.

FIG. 8 shows the single-row array of lens preformers that has been fabricated by the above-described procedure and which is generally indicated by 144, as sandwiched between two side plates 120. As in the prior art, the array 144 has such a structure that not only the gaps between lens preformers but also the gaps between each lens preformer and side plates have been thoroughly filled with the completely cured impregnating resin 139. The completely buried lens preformer array may optionally be cut off on both lateral sides; it is also cut by a specified length (lens length) in a direction normal to the longitudinal axes of the individual lens preformers, thereby yielding a gradient index rod lens array.

In the foregoing example, the impregnating resin sheet is given pressure by the simplest method of placing a weight. If desired, a hot press may be substituted. In practical applications, however, roll pressing is desirably adopted so that gradual pressure application proceeds from one end to the other as accompanied by displacement of air. Pressure application to a plane sometimes fails to achieve complete removal of gas. In the present invention, the ridges formed on the side plate constrain the movement of lens preformers and this is particularly effective in preventing the departure from precise lens arrangement even if the rolling pressing method is employed.

In the foregoing example, both side plates have a multiple of ridges. This is the most preferred for the purpose of minimizing the departure from precise lens arrangement. If desired, the side plate to be used with the lens preformers that are to be buried partially in the impregnating resin may be provided with a striped pattern of ridges but the other side plate remains flat as in the prior art. With this design, the movement of lens preformers can be suppressed to some extent during thermal fusion, thereby reducing the departure from precise lens arrangement.

Figure 9:
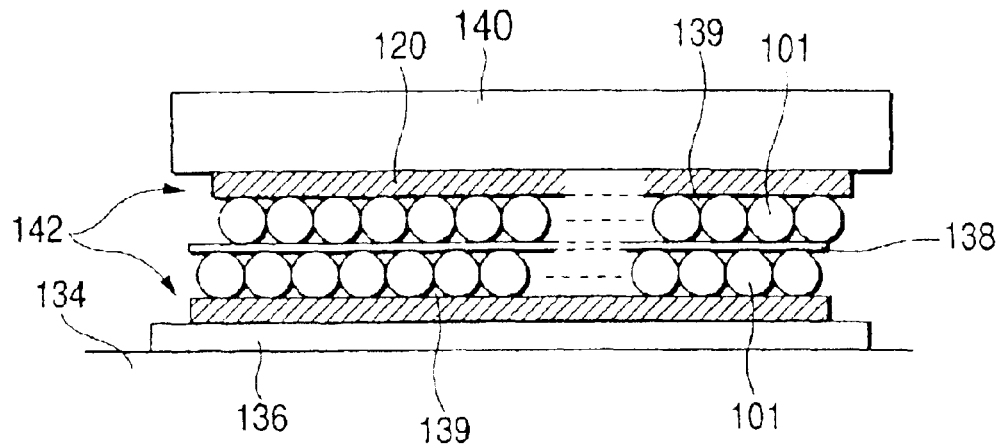
FIG. 9 shows a step in a process for preparing a two-row array of lens preformers.
Figure 10:
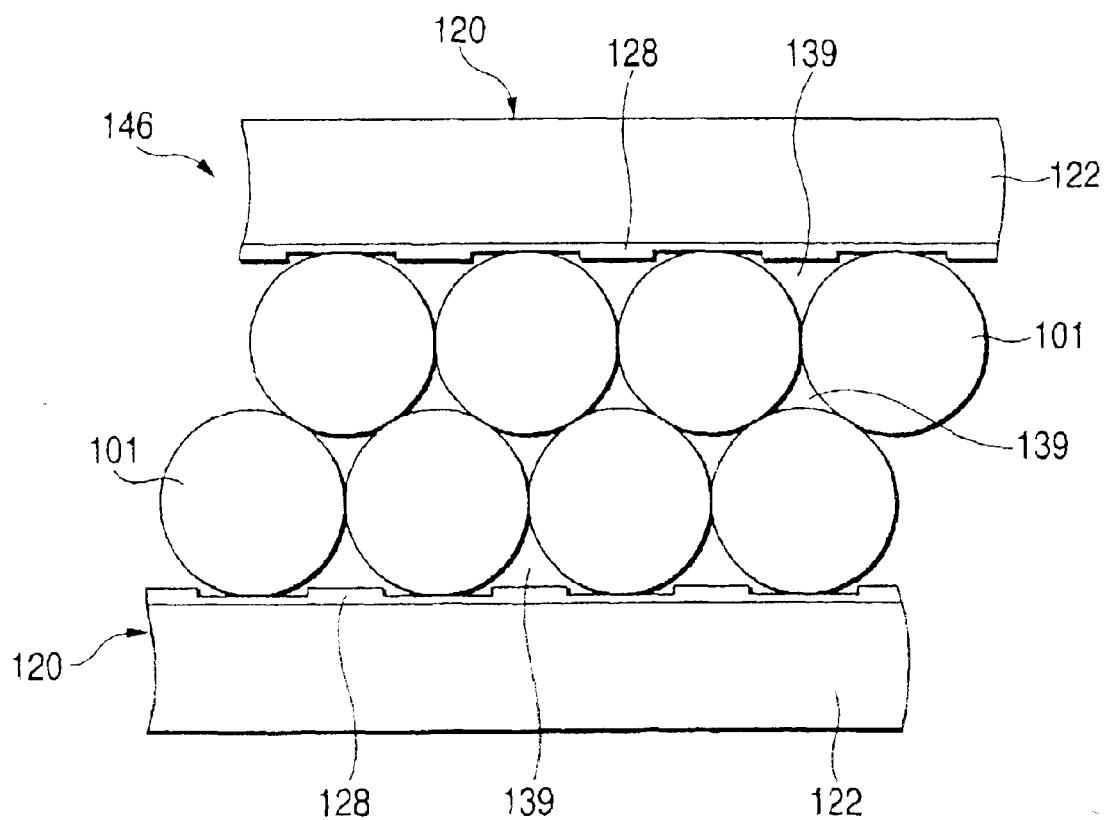
FIG. 10 shows an exemplary two-row array of lens preformers.
Figure 11:
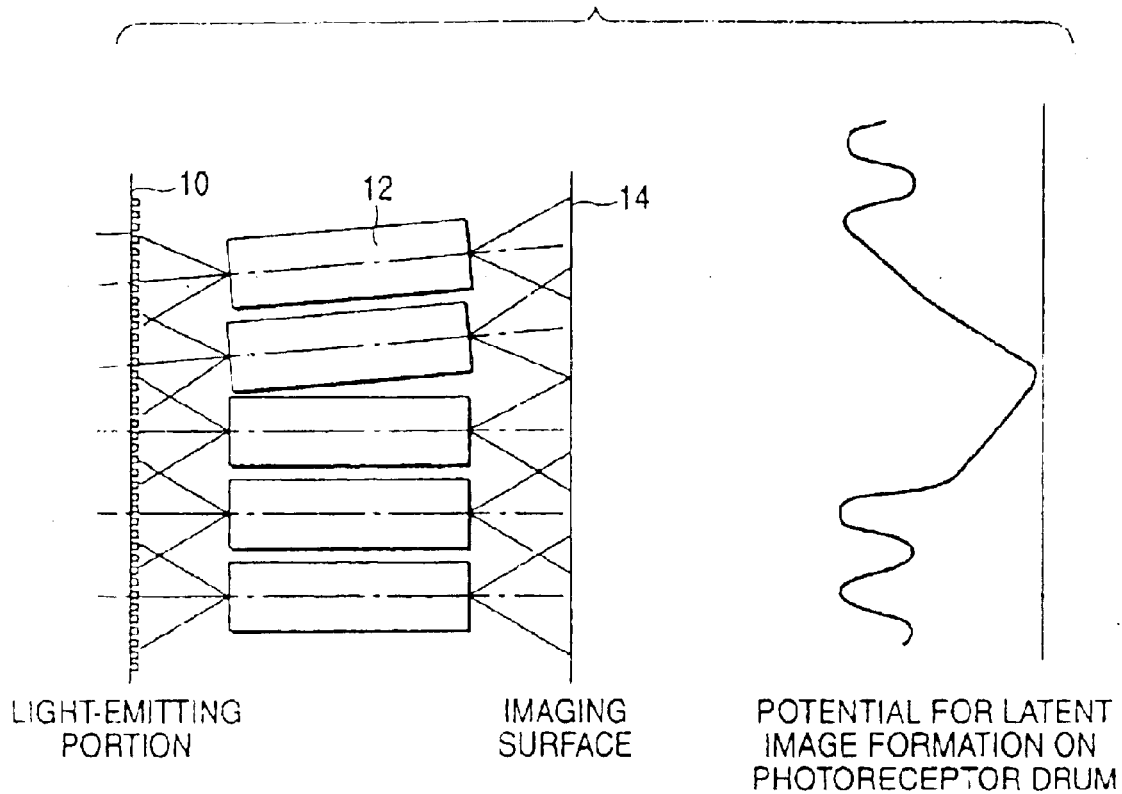
FIG. 11 shows how a departure from the desired lens arrangement in an image writing optical system affects the potential at which a latent image is formed.

To produce a two-row rod lens array, the step shown in FIG. 9 is added. Two partially buried lens preformer arrays 142 are prepared by the same procedure as in the foregoing example and placed in such a way that the sides where the lens preformers 101 are provided face each other, with another impregnating resin sheet 138 interposed. The resin sheet 138 is then heated to become viscous and given pressure under a weight 140. As a result, the resin flows into the gaps between lens preformers so that they are completely buried in the resin. All resins including the one that has been cured provisionally are then cured completely to fix the lens preformers. FIG. 10 shows the two-row array of lens preformrs that has been fabricated by the above-described process and which is generally indicated by 146, as sandwiched between two side plates 120. As in the foregoing example, the array is then cut by a specified length (lens length) in a direction normal to the longitudinal axes of the individual lens preformers, thereby yielding a gradient index rod lens array.

The resin sheet 138 to be used in the present invention must be such that compared to the diameter of lens preformers 101 and their alignment pitch, it has an appropriate thickness to fill the gaps between lens preformers. In the foregoing examples, the resin sheet 138 is provisionally bonded to the side plate before it is heated under pressure. Alternatively, the resin sheet may simply be placed on the side plate and heated under pressure.

In the foregoing examples, the striped pattern of ridges is provided by screen printing but they may be provided by photolithography. The ridges formed by photolithography have more precise shapes than those formed by screen printing.

A photolithographic process of forming ridges is outlined below.

(1) Apply a Resist to the Entire Surface of One Side of a Side Plate

For effective thickness control, a blanket resist coat is desirably formed by applying an aqueous resist onto the side plate through spray nozzles. In spray coating, the coating thickness per application is set and a plurality of applications are performed until the desired coating thickness is obtained. For example, an initial resist coat is applied in a thickness of about 15 μm to planarize the side plate substrate by covering its surface roughness; a subsequent resist coat is sprayed in a thickness of 30 μm to control the resist thickness within a range of 45±5 μm. Resist materials are available in two types, negative and positive. The negative-acting resist is such that the part exposed to light is photopolymerized to become insoluble in a liquid developer; in the case of the positive resist, the exposed part becomes soluble. The positive resist has high image resolution and the negative resist has somewhat lower image resolution but it features good bonding property and high chemical resistance. A suitable type of resist should be chosen depending on use and other factors. In the example that follows, a positive-acting resist having high image resolution was used.

(2) Paste a Mask Sheet

A mask sheet from which a striped pattern of predetermined shape has been cut out is pasted to the resist-coated surface of the side plate.

(3) Exposure

The unmasked areas of the resist layer are exposed to uv rays to become soluble in a liquid developer.

(4) Etching

The mask sheet is stripped before etching (development). Three major etching processes can be used; dip etching; paddle etching; spray etching. Spray etching is preferred since it has many advantages such as high etching rate, good etching uniformity, and small undercuts.

(5) Cleaning

The developed surface is cleaned in the final step.

The above-described procedure gives a side plate having a striped pattern of multiple ridges formed on the surface of the side of a side plate substrate where lens preformers are to be arranged; the ridges extend in the longitudinal direction of lens preformers and are spaced apart on the same pitch as the lens preformers. Using this side plate, one can produce a rod lens array by bonding together gradient index rod lenses such that they are located between ridges on the side plate as in the foregoing examples.

As described on the foregoing pages, the invention provides a process for producing a rod lens array which, on account of the use of a grooved platen, can prevent lens preformers from being positionally offset while they are arrayed. What is more, the use of side plates having a multiple of ridges formed with high precision allows the movement of lens preformers to be constrained during installation of the side plates, thereby suppressing the variation in the arrangement of lens preformers. As a result, the rod lens array produced can suitably be used as a component in an image writing system to insure higher precision in the imaging position.

In the process of the invention, ridges are formed on the side plate itself by screen printing or photolithography and, hence, a means for constraining the movement of lens preformers can easily be formed in high dimensional precision and at low cost, making the process of the invention adapted to volume production of rod lens arrays and allowing for the use of lens preformers of smaller diameter.

Figure 12:
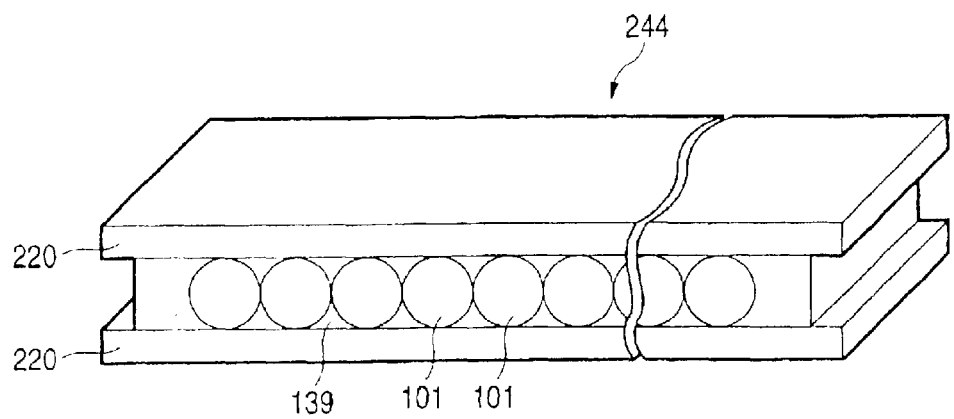
FIG. 12 is a perspective view of a rod lens array in one embodiment of the invention.

In the embodiment shown in FIG. 12, a multiple of rod lenses 101 are arranged in a row between two frame plates 220 and the gaps between rod lenses are filled with a black resin 139. Thereafter, both end faces of each rod lens are optically polished to give a specified lens length, whereby a rod lens array 244 is fabricated. The black resin 139 may be a black silicone resin or a black epoxy resin. Hence, the black resin 139 not only tills the gaps between rod lenses 101 but also combines integrally with the rod lenses 101. Both sides of the rod lens array 244 which are lateral to the direction of its width are formed of the frame plates 220. The frame plates 220 have preferably the same structure as the already mentioned side plates 120 but they may be flat plates (i.e., the side plate substrate 122).

Figure 22:
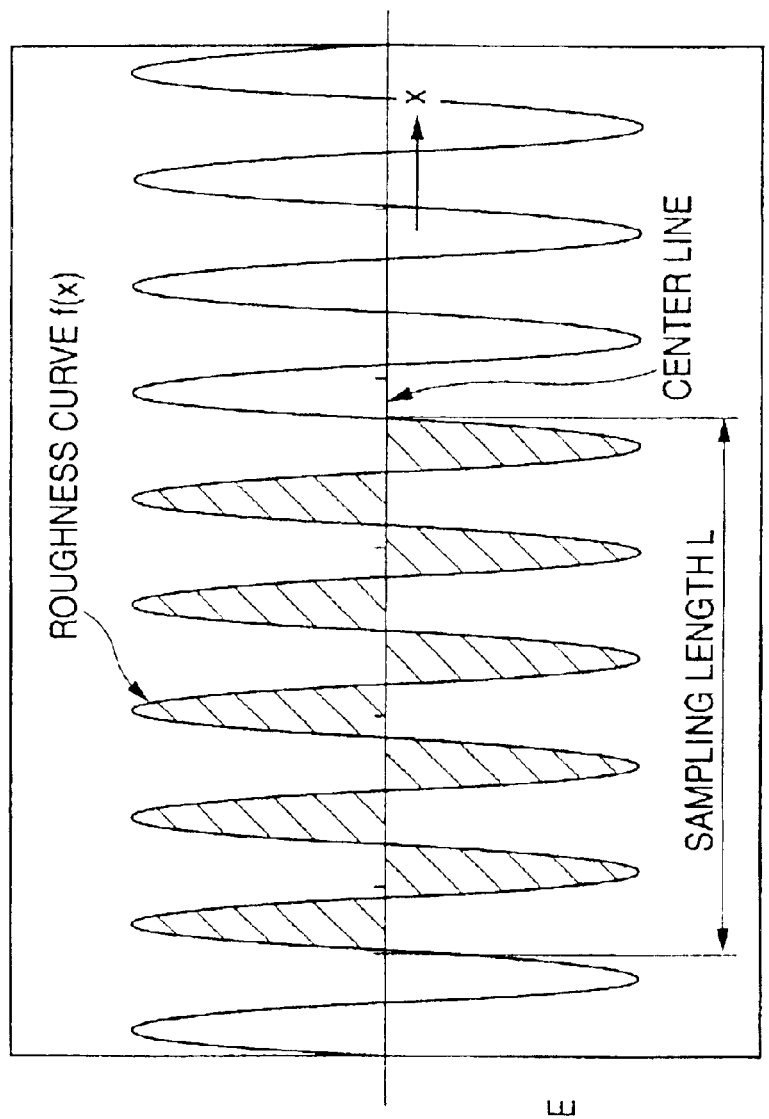
FIG. 22 shows a roughness curve f(X) in relation to the sampling length L and the center line.

In the embodiment under consideration, the center-line-average roughness is used as an index for the surface roughness of the peripheral surface of each rod lens 101 (see FIG. 22). Surface roughness may be measured with a roughness meter of stylus type. In the case of a rod lens, the stylus is traversed over a specified sampling length L in the axial direction (x-direction). If the roughness curve obtained by the measurement is written as y=f(x), the center-line-average roughness Ra is defined by the following equation:

$$Ra = \frac{1}{L} \cdot \int_0^L |f(x)| dx$$

where the position of the center line (y=0) is so determined as to satisfy the following equation:

$$\int_0^L f(x) dx = 0$$

The center-line-average roughness can be defined and measured in all positions on the peripheral surface of the rod lens. In practice, however, rod lenses having a lens length from several millimeters to about 20 mm do not have significant variations on their peripheral surfaces, so the value determined from the surface roughness data obtained for a particular lens by measurement over a sampling length comparable to the lens length along a straight line that passes through any desired point on its peripheral surface and which is parallel to its axis may safely be taken as the representative value for the lens. It necessary, two such straight lines may be drawn in different positions and the center-line-average roughness values as determined from the surface roughness data taken on the respective straight lines are averaged to give the representative value. The sampling length L may be set to be shorter than the lens length.

In the embodiment under consideration, the representative value for the centerline-average roughness of each rod lens 101 is within the range of 0.5 $\mu$m–2.0 $\mu$m. Hence, the representative value for the center-line-average roughness of the whole rod lens array composed of a plurality of rod lenses is also within the range of 0.5 $\mu$m–2.0 $\mu$m.

In the embodiment under consideration, the representative value for the center-line-average roughness is between 0.01 $\mu$m and 0.2 $\mu$m as expressed by standard deviation for the whole rod lens array. The standard deviation is desirably determined from the measurements for all lens elements that constitute the lens array; however, if the number of constituent lenses is so great that an unduly long time is taken to perform the measurement, sampling may be effected at specified intervals.

In the embodiment under consideration, representative values for the diameters of the individual rod lenses that constitute a rod lens array are between 0.01 $\mu$m and 2.5 $\mu$m as expressed by standard deviation for the whole lens array. In this case, too, lens diameter is measured at one or more sites for each lens and if measurement is done at a plurality of sites, the average of the measured values is taken as the representative value.

The MTF (modulation transfer function) of the rod lens array fabricated by the process described above is measured by the following procedure. An image of a rectangular wave grating pattern as produced from the rod lens array 244 is received by an optical sensor such as a CCD image sensor and from the illumination level of the received light, the response function (MTF) of the rod lens array is calculated by the following equation:

$$MTF(w) = \{i(w)max - i(w)min\}/\{i(w)max + i(w)min\} \times 100(\%) \quad (1)$$

where i(w)max and i(w)min are a maximum and a minimum value, respectively, of the rectangular wave response at a spatial frequency w (lp/mm) or a spatial frequency w (dpi). The closer to 100% the MTF is, the more faithful the produced image is to the original image. The measurement uses the monochromatic light obtained by passing halogen light through an optical filter at a wavelength of 740 nm. The pinhole array in the test chart had a density of 600 dpi or 1200 dpi and every other dot was turned on and off in the range of measurement.

The MTF which is an index for the optical performance of the rod lens array 244 generally reflects the resolving powers of the constituent rod lenses 101. Higher MTF values mean that the individual rod lenses 101 that compose the rod lens array 244 have high resolving power and vice versa. The reason is as follows. If the resolving power is high, the minimum value of the rectangular wave response, i(w)min, in eq (1) is small and the ratio of the numerator to the denominator in eq. (1) which represents the MTF value increases accordingly. For example, if the response waveform is so close to the original image that i(w)min is sufficiently near zero, both the numerator and the denominator are sufficiently near i(w)max and the MTF value approaches 100%.

EXAMPLE 1

We now describe the center-line-average roughness of the peripheral surface of the rod lens 101 and its variation as they relate to the MTF value.

Figure 13:
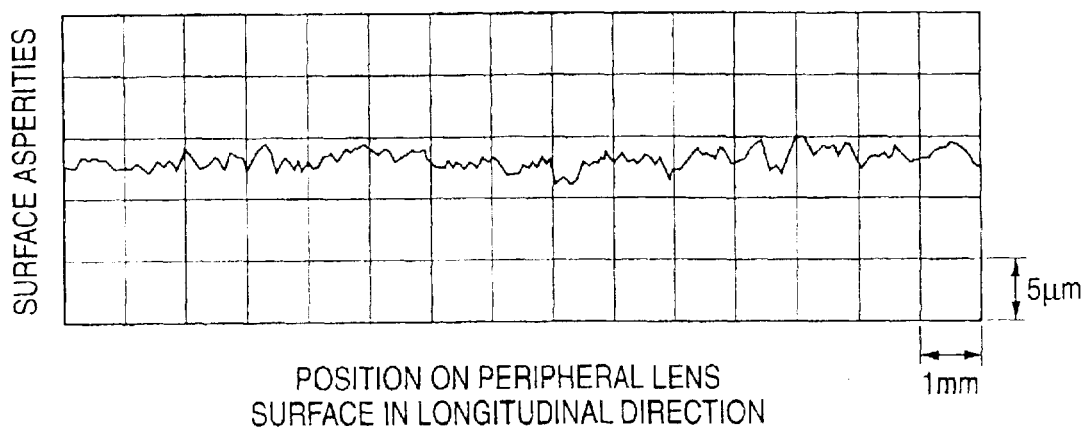
FIG. 13 is a graph showing asperities on the peripheral surface of a rod lens in the same array.
Figure 19:
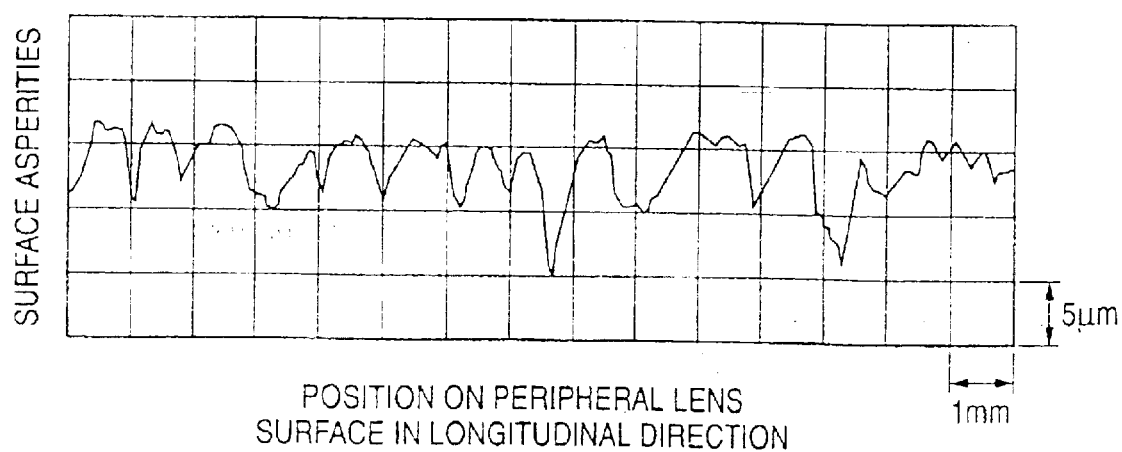
FIG. 19 is a graph showing asperities on the peripheral surface of a comparative rod lens.

FIG. 13 shows an exemplary surface texture of the peripheral surface of the rod lens used in Example 1. The record in FIG. 13 was obtained by putting the probe of a surface roughness meter of stylus type in contact with the peripheral surface of the rod lens and traversing it parallel to the lens axis. Comparing FIG. 13 with FIG. 19, one can see that the peripheral surface of the rod lens of Example 1 was suppressed in both the center-line-average roughness and its variation.

Figure 20:
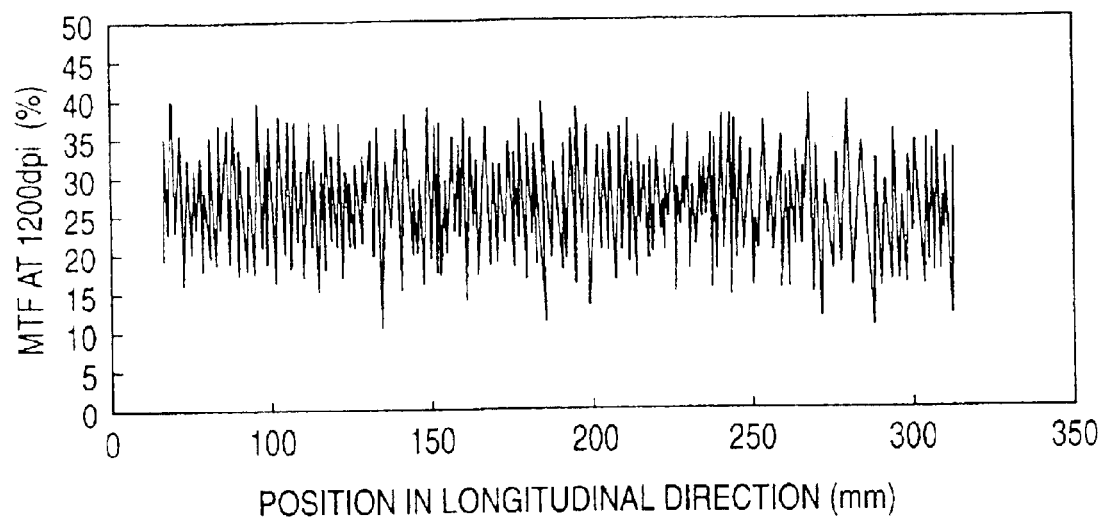
FIG. 20 is a graph showing the result of MTF measurement on comparative rod lens array A.

FIG. 20 is a graph showing the MTF values of comparative array A. The average value of the center-line-average roughness of array A is 2.17 $\mu$m and its standard deviation is 0.26 $\mu$m. The average value and standard deviation of the center-line-average roughness of the array can be determined by the following procedure: a certain number of rod lenses are randomly sampled from the whole group of the lenses that compose the array; the representative value is measured for the center-line-average roughness of each of the sampled lenses; the thus measured representative values are averaged and their standard deviations are determined (the same procedure was used in the following description). The representative value for the center-line-average roughness of each lens is determined from the surface texture as obtained by tracing any desired straight line on the peripheral surface of the lens that extends parallel to its longitudinal axis over a distance substantially equal to the entire lens length. FIG. 20 shows the MTF values as a function of the position in the longitudinal direction of the array.

Figure 14:
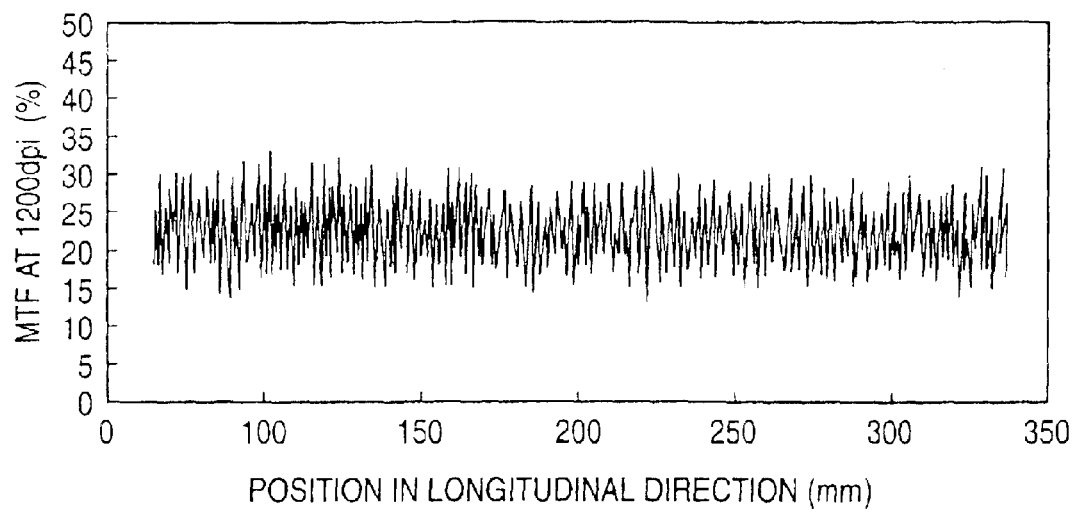
FIG. 14 is a graph showing the result of MTF measurement on rod lens array B of Example 1.

FIG. 14 is a graph showing the MTF values of array B in Example 1. The average value of the center-line-average-roughness of array B for its peripheral surface was 1.70 $\mu$m and its standard deviation was 0.21 $\mu$m. Comparing with the data in FIG. 20, one can see that array B experienced smaller variations in MTF value with the position in the longitudinal direction.

Figure 15:
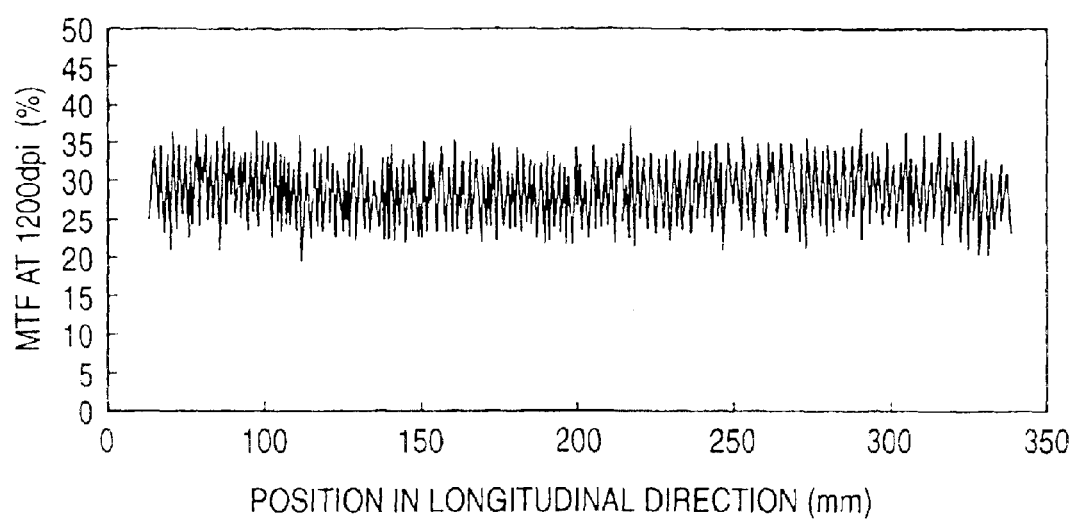
FIG. 15 is a graph showing the result of MTF measurement on rod lens array C of Example 1.

FIG. 15 is a graph showing the MTF values of array C in Example 1. The average value of the center-line-average roughness of array C for its peripheral surface was 1.39 $\mu$m and its standard deviation was 0.13 $\mu$m. Comparing with the data in FIG. 20, one can see that the MTF value of array C was substantially constant at varying positions in the longitudinal direction and hence it was practically position-independent.

In order to describe the position-dependent variation of the MTF value, we introduce the parameter G, or an index for the variation in resolving power, which is calculated by the following equation (2) as the ratio between MTF$\sigma$ (the standard deviation of the MTF value for the whole array) and MTFave (the average value of MTF):

$$G = (MTF\sigma/MTFave) \times 100(\%) \quad (2)$$

On the basis of the results of MTF measurement on arrays A–C, the present inventors prepared. Table 1 which shows the relationships between the resolving power variation index G and each of the average value and deviation of the center-line-average (CLA) roughness of the peripheral surface of the constituent rod lens.

TABLE 1

| Array | Average of CLA roughness of peripheral lens surface | Standard deviation of CLA roughness of peripheral lens surface | Resolving power variation index G |
|---|---|---|---|
| A | 2.17 $\mu$m | 0.26 $\mu$m | 16.84 |
| B | 1.70 $\mu$m | 0.21 $\mu$m | 12.57 |
| C | 1.39 $\mu$m | 0.13 $\mu$m | 9.65 |

The result with array B shows that reducing the average of the center-line-average roughness of the peripheral surface of a rod lens to 2.0 $\mu$m and below was effective in suppressing the variation in resolving power. However, if the average of the center-line-average roughness of the peripheral lens surface is unduly small, the effect of stray light becomes significant; therefore, the average of the center-line-average roughness of the peripheral lens surface is desirably at least 0.5 $\mu$m. Therefore, the average of the center-line-average roughness of the peripheral surface of a rod lens is desirably in the range of 0.5 $\mu$m–2.0 $\mu$m. This means that the peripheral surfaces of individual rod lenses should desirably have a center-line-average roughness in the range of 0.5 $\mu$m–2.0 $\mu$m.

In array C, the standard deviation of the center-line-average roughness of the peripheral lens surface was further reduced to less than 0.2 $\mu$m and this was effective in further suppressing the variation in resolving power. Therefore, the standard deviation of the center-line-average roughness of the peripheral surface of a rod lens is desirably no more than 0.2 $\mu$m.

EXAMPLE 2

The relationship between the MTF value and the variation in the diameter of a rod lens is described in this example.

Figure 21:
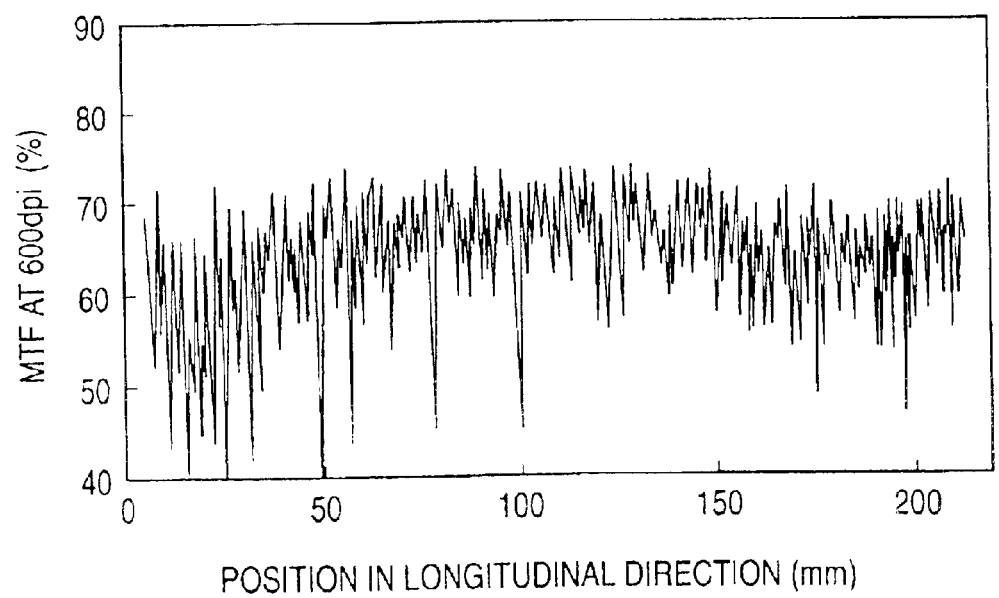
FIG. 21 is a graph showing the result of MTF measurement on comparative rod lens array D.

FIG. 21 shows the result of MTF measurement on comparative array D. The data in FIG. 21 describes MTF values as a function of the position in the longitudinal direction of the array. The standard deviation of the diameter of each rod lens in the array D was 3.50 $\mu$m.

Figure 16:
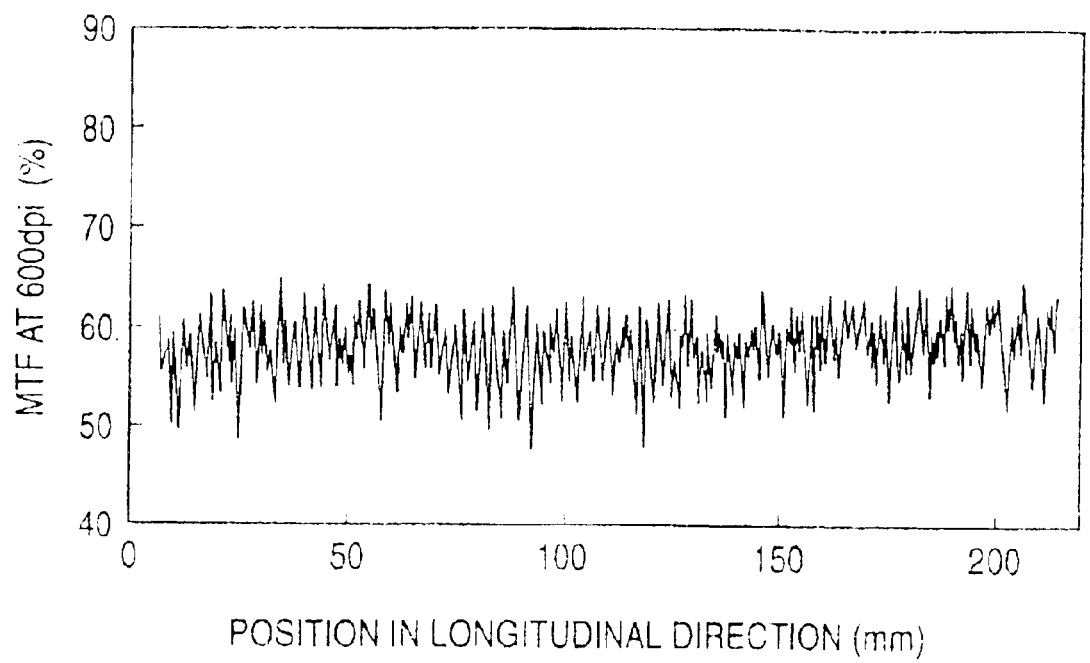
FIG. 16 is a graph showing the result of MTF measurement on rod lens array E of Example 2.
Figure 17:
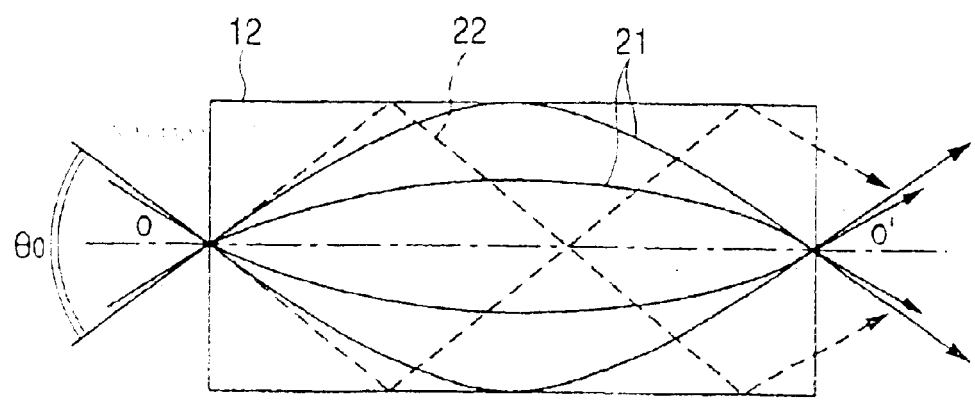
FIG. 17 shows in section how stray light occurs in a rod lens.
Figure 18:
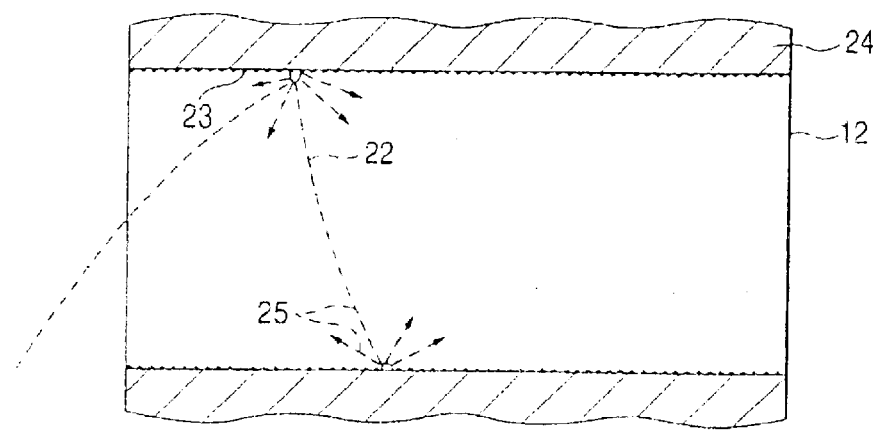
FIG. 18 shows in section how stray light can be suppressed in a rod lens.

FIG. 16 shows the result of MTF measurement on array E of Example 2. The standard deviation of the diameter of each rod lens in the array E was 2.02 $\mu$m. Comparison with the data in FIG. 21 shows that the MTF value of array E was substantially constant at varying positions in the longitudinal direction and hence it was practically position-independent.

On the basis of the results of MTF measurement on arrays D and E, the present inventors prepared Table 2 which shows the relationships between the resolving power variation index G and the variation in the diameter of the constituent rod lens.

TABLE 2

| Array | Standard deviation of rod lens diameter | G |
|---|---|---|
| D | 3.50 μm | 8.15 |
| S | 2.02 μm | 4.80 |

Obviously, the resolving power variation index G could be reduced by suppressing the variation in the diameter of the rod lens. The result with array E shows that the variation in the diameter of the rod lens is desirably held no greater than 2.5 μm.

According to the foregoing embodiments of the present invention, the following advantages are achieved.

(1) The average value of the center-line-average roughness of the peripheral surface of a rod lens is specified to lie within the range of 0.5 μm–2.0 μm and this contributes to suppressing the variation that occurs in the resolving power of a rod lens array in the longitudinal direction.

(2) The standard deviation of the center-line-average roughness of the peripheral surface of a rod lens is specified to lie within the range of 0.01 μm–0.2 μm; as a result, variations are less likely to occur in the effective lens aperture which contributes to satisfactory image formation and the variation that occurs in the resolving power of a rod lens array in the longitudinal direction can be effectively suppressed.

(3) The standard deviation of the diameter of a rod lens is specified to lie within the range of 0.01 μm–2.5 μm; as a result, there is little chance for the occurrence of a departure from the desired lens array that would otherwise result from the variation in the diameter of the rod lens and the individual rod lenses in the rod lens array can be effectively protected against large inclinations from their optical axes.

(4) By combining the features described in (1) and (2), the variation that may occur in the resolving power of a rod lens array in the longitudinal direction can be suppressed in a more effective way. By combining the features described in (1) and (3) or those described in (1)–(3), the variation that may occur in the resolving power of a rod lens array in the longitudinal direction and the off-axis inclinations of the individual rod lenses in the rod lens array can be effectively suppressed.

(5) The rod lenses are surrounded with a resin, so if the resin is a black resin that is a good absorber of light, any stray light that occurs in the rod lenses can be effectively absorbed.

(6) The use of frame plates offers the advantage that the rod lenses can be easily assembled into an array by using the frame plates as a guide in fabrication.

As described above, according to the present invention, rod lenses can be arranged with a small enough departure from the desired alignment to produce a rod lens array that will experience minimum variations in resolving power in a longitudinal direction.

What is claimed is:

1. A process for producing a rod lens array comprising the steps of:
providing an aligning tool having a plurality of grooves formed side by side;
placing gradient index rod lenses in an aligned state with each other within the grooves, said gradient index rod lenses being placed at an average spacing of 1 μm–5 μm;
fixing the gradient index rod lenses to form an integral unit as they maintain the aligned state; and
polishing end faces of each rod lens.

2. The process according to claim 1, further comprising, between the step of fixing the rod lenses and the step of polishing, the steps of:
removing the aligning tool; and
cutting each rod lens to a specified lens length.

3. A rod lens array obtainable by the process according to claim 1, which has the gradient index rod lenses aligned at an average spacing of 1 μm–5 μm.

4. The process according to claim 1, wherein:
the step of providing an alignment tool includes selecting the aligning tool having a desired pitch of the grooves in relation to a diameter of the gradient index rod lenses to be placed within the grooves.

5. The process according to claim 1, wherein:
the step of fixing the rod lenses includes fixing the gradient index rod lenses onto a frame having a strip pattern of multiple ridges arranged at the same pitch as the gradient index rod lenses thus aligned.

6. The process according to claim 5, wherein:
the strip pattern of the multiple ridges is formed by a photolithographic process.

7. The process according to claim 5, further comprising:
providing a pair of the integral units, each formed according to the steps of providing, placing and fixing;
removing the aligned tool from each of the integral units; and
coupling and fixing the integral units to each other so that the gradient index rod lenses are located between the frames.

8. The process according to claim 1, wherein each of the rod lenses to be placed has a center-line-average roughness of 0.5 μm–2.0 μm on the peripheral surface.

9. The process according to claim 1, wherein the rod lenses to be placed are such that representative values for the center-line-average roughness of their peripheral surfaces are between 0.5 μm and 2.0 μm as expressed for the whole lens array.

10. The process according to claim 1, wherein the rod lenses to be placed are such that representative values for the center-line-average roughness on their peripheral surfaces are between 0.01 μm and 0.2 μm as expressed by standard deviation for the whole lens array.

11. The process according to claim 1, wherein the rod lenses to be placed are such that representative values for their diameters are between 0.01 μm and 2.5 μm as expressed by standard deviation for the whole lens array.

12. A process for producing a single-row rod lens array, comprising:
a lens arranging step in which a grooved aligning tool having a multiple of shallow grooves formed parallel to each other at a constant pitch is supplied with multiple gradient index rod lenses such that they are placed in alignment with each other within said shallow grooves;
a partial burial step in which an impregnating resin sheet and a frame are placed in a face-to face relationship with the group of the thus arranged rod lens, then heat is applied to render said resin sheet viscous and pressure is also applied so that the individual rod lenses are bonded to the frame as they are partially buried in the resin and, thereafter, the bonded rod lenses are detached from said aligning tool; and
a complete burial step in which an impregnating resin sheet and a frame are placed in a face-to-face relationship with the partially buried rod lenses in array form, then heat is applied to render said resin sheet viscous and pressure is also applied so that the individual rod lenses are bonded to the frame as they are buried completely in the resin;

wherein a frame with a striped pattern of multiple ridges that extend along the rod lenses and that are arranged at the same pitch as the rod lenses is used as the frame in the partial burial step or in both partial and complete burial steps, and the rod lenses are bonded to said frame such that each of them is located between adjacent ridges.

13. A process for producing a two-row rod lens array, comprising:

a lens arranging step in which a grooved aligning tool having a multiple of shallow grooves formed parallel to each other at a constant pitch is supplied with multiple gradient index rod lenses such that they are placed in alignment with each other within said shallow grooves;

a partial burial step in which an impregnating resin sheet and a frame are placed in a face-to face relationship with the group of the thus arranged rod lens, then heat is applied to render said resin sheet viscous and pressure is also applied so that the individual rod lenses are bonded to the frame as they are partially buried in the resin and, thereafter, the bonded rod lenses are detached from said aligning tool; and a complete burial step in which an impregnating resin sheet is placed between two arrays of the partially buried rod lenses such that the rod lenses in one array are in a face-to-face relationship with those in the other array, then heat is applied to render said resin sheet viscous and pressure is also applied so that the individual rod lenses are bonded between the frame as they are buried completely in the resin;

wherein a frame with a striped pattern of multiple ridges that extend along the rod lenses and that are arranged at the same pitch as the rod lenses is used as the frame in the partial burial step and the rod lenses are bonded to said frame such that each of them is located between adjacent ridges.

14. The process according to claim 12, wherein the multiple ridges are formed by screen printing.

15. The process according to claim 14 wherein a coating is applied to the entire surface of one side of the frame to form an undercoat, and a multiple of ridges are formed on the undercoat.

16. The process according to claim 15, wherein the undercoat is formed by applying one or two layers of a coat having a thickness of 5–15 μm, the ridges have a thickness of 10–30 μm, and the pitch of the ridges is set at a value near the maximum variation in the diameter of rod lenses that is anticipated in a manufacturing process.

17. The process according to claim 16, wherein the frame is a fiber glass-reinforced plastic laminated plate, and an epoxy resin based coating is used to form the undercoat and the ridges.

18. The process according to claim 16, wherein the frame is a glass plate, and a light-opaque epoxy resin based coating is used to form the undercoat and the ridges.

19. The process according to claim 12, wherein the multiple ridges are formed by photolithography comprising the steps of applying a resist to the entire surface of the frame, exposing it to light through a mask and etching away the areas that have become soluble.

20. The process according to claim 19, wherein the conditions for resist application and etching are controlled such that ridges 10–30 μm thick are formed on the underlying resist blanket having a thickness of 5–15 μm.

21. The process according to claim 12, wherein each of the rod lenses to be placed has a center-line-average roughness of 0.5 μm–2.0 μm on the peripheral surface.

22. The process according to claim 12, wherein the rod lenses to be placed are such that representative values for the center-line-average roughness on their peripheral surfaces are between 0.5 μm and 2.0 μm as expressed for the whole lens array.

23. The process according to claim 12, wherein the rod lenses to be placed are such that representative values for the center-line-average roughness on their peripheral surfaces are between 0.01 μm and 0.2 μm as expressed by standard deviation for the whole lens array.

24. The process according to claim 12, wherein the rod lenses to be placed are such that representative values for their diameters are between 0.01 μm and 2.5 μm as expressed by standard deviation for the whole lens array.

25. The process according to claim 1 wherein said rod lens array is an imaging rod lens array.

* * * * *